MAGNETIC HEAD MOUNT WITH LEAF SPRINGS AND PNEUMATIC ACTUATION

Filed May 17, 1968

2 Sheets-Sheet 1

INVENTORS
LESLIE R. WALSTROM,
WAYNE J. KING
BY
Burd, MacEachron, Braddock, Bartz & Schwartz
ATTORNEYS

MAGNETIC HEAD MOUNT WITH LEAF SPRINGS AND PNEUMATIC ACTUATION

Filed May 17, 1968 2 Sheets-Sheet 2

INVENTORS
LESLIE R. WALSTROM,
WAYNE J. KING
BY
Burd, MacEachron, Braddock,
Bartz & Schwartz
ATTORNEYS United States Patent Office 3,548,392

Patented Dec. 15, 1970

3,548,392

MAGNETIC HEAD MOUNT WITH LEAF SPRINGS AND PNEUMATIC ACTUATION

Leslie R. Walstrom, Excelsior, Minn., and Wayne J. King, San Diego, Calif., assignors to Fabri-Tek, Incorporated, Minneapolis, Minn., a corporation of Minnesota Filed May 17, 1968, Ser. No. 730,020
Int. Cl. G11b *21/24, 21/10, 5/56*
U.S. Cl. 340—174.1 9 Claims

ABSTRACT OF THE DISCLOSURE

Apparatus for positioning a magnetic read-write head, the apparatus having an outer frame adapted to be rigidly mounted, an inner frame mounted between a pair of parallel leaf springs which are connected to the outer frame, and a magnetic head carriage mounted between a second pair of parallel leaf springs which are connected to the inner frame. The springs are mounted such that the inner frame and the carriage have the same one dimension of movement. Actuators are provided for selectably applying force to move the inner frame and the carriage against the respective springs. Stop means are provided for limiting travel of the inner frame and the carriage, to provide precise, fast head positioning by selection of desired actuators.

BACKGROUND OF THE INVENTION

As is well known in the art of magnetic recording systems, a single magnetic head is often used to read from or write on any one of a plurality of magnetic tracks which store information. Positioning apparatus for the head is obviously necessary to enable the head to travel from track to track. Though many such positioning devices are presently known in the art, there still exist the problems of finding a fast, maintenance free positioning device which will provide positive relative positioning between the head and the track, and may be manufactured at a low cost.

The apparatus of this invention provides advantages of high speed response, though it i s actuated by a low pressure pneumatic supply. Further, the apparatus of this device is essentially frictionless, requiring no lubrication over a long life. Also, the apparatus of this invention features positive stops at each desired increment of head travel, while providing rigidity in all planes other than the plane of movement, and yet can be manufactured at comparatively low unit cost.

SUMMARY OF THE INVENTION

Briefly described, the apparatus of this invention comprises an outer frame, which is adapted to be rigidly mounted to the frame of the magnetic recording system. At opposite ends of the outer frame are connected a pair of parallel extending leaf springs, and between the springs is mounted an inner frame such that it is free to move in a single dimension determined by the parallel lead springs. A second pair of parallel extending lead springs are mounted on opposite sides of the inner frame, and a carriage adapted to carry a magnetic read-write head is mounted between the second pair of springs. The second pair of springs are mounted such that the carriage has the same single dimension of movement as the inner frame. A first pair of adjustable stop bolts are mounted in the first frame such that they limit movement of the inner frame. A second pair of stop bolts is mounted in the inner frame to likewise limit the movement of the carriage. A pair of pneumatic actuators are mounted on each side of the inner frame to provide selected movement thereto, and a second pair of pneumatic actuators is mounted on each side of the carriage to provide selected movement thereto. Application of pneumatic pressure to the selected actuators causes the inner frame and the carriage to be forced against the respective selected stop bolt. The stop bolts may be adjusted such that the stop positions cause a magnetic head carried by the carriage to be properly positioned over a selected magnetic track.

DESCRIPTION OF THE PREFERRED EMBODIMENT

Figure 1:
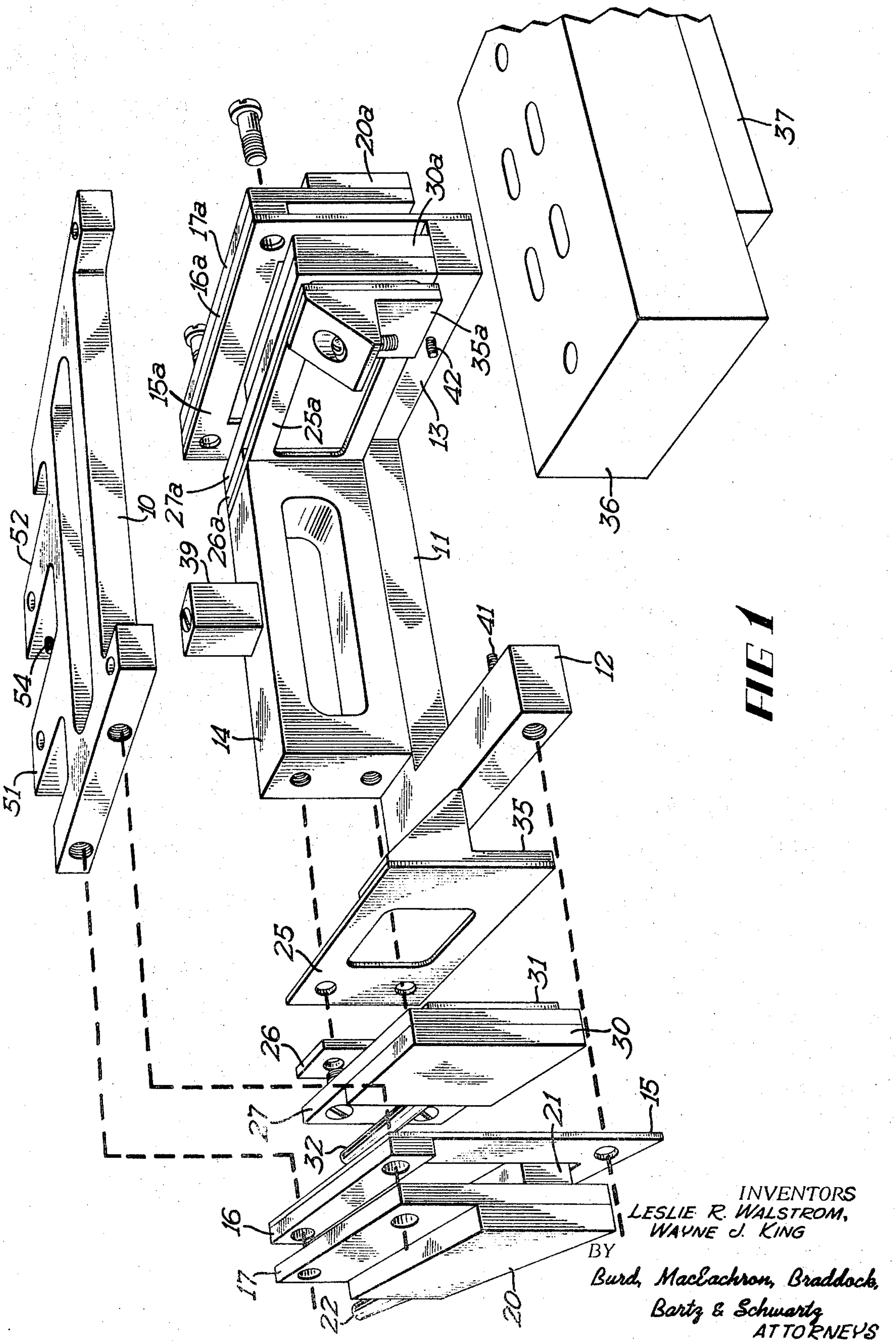
FIG. 1 is a three dimensional partially exploded view of the magnetic head positioning apparatus of this invention.

Referring first to FIG. 1, there is shown an outer frame 10 which includes a plurality of bolt or rivet apertures which allow it to be rigidly connected to the frame of a magnetic recording system (not shown).

To one end of frame 10 there is connected a substantially rectangular leaf spring 15, which includes an aperture. Also mounted to frame 10, adjacent the outer surface of spring 15, is a spacer 16, and mounted to frame 10 adjacent spacer 16 is an actuator mounting plate 17.

A pneumatic actuator 20 is mounted on plate 17 such that an actuator head 21 extends through an aperture in plate 17 and through the adjacent aperture in spring 15. Actuator 20 includes a tube 22 which is adapted to connect to a source of pneumatic pressure (not shown). Though not shown, it will be understood that actuator 20, as well as all other actuators mentioned below, is preferably a diaphram operated actuator which contains an internally mounted diaphragm adapted to react to the presence of pneumatic pressure to force actuator head 21 in an outward direction. On release of pneumatic pressure, the diaphragm in actuator 20 will react to remove force from head 21.

It will be noted that connected to the other side of outer frame 10 is an identical, parallel set of facing apparatus as that described above, including an apertured leaf spring **15*a* and an actuator 20*a***.

Still referring to FIG. 1, there can be seen an inner frame 11 of generally U-shaped configuration, including a pair of parallel extending arms 12 and 13. An upwardly extending substantially rectangular member 14 is mounted on frame 11. Arms 12 and 13, are connected, respectively, to springs 15 and **15*a*, such that frame 11 is allowed to move in two directions within one dimension. It will be recognized that pressure applied to frame 11 will cause it to move in a path which is truly arcuate, due to its connection between the flexing leaf springs 15 and 15*a***. However, the path of arc is so great that for the practical purpose of this invention, and for the tolerances allowable in positioning of a magnetic head to a magnetic track, this arcuate path will herein be referred to as a straight line single dimension path.

Connected to one end of member 14 is a leaf spring 25. Also connected to the same end of member 14 and adjacent the outer surface of spring 25 is a spacer 26. An actuator mounting plate 27 is mounted adjacent plate 26, and an actuator 30 is mounted on plate 27 such that an actuator head 31 of actuator 30 extends through an aperture in plate 27 to contact the outer surface of spring 25. Actuator 30 includes a tube 32 adapted to be connected to a source of pneumatic pressure. Actuator 30 operates in the manner above described for actuator 20.

Mounted on the opposite end of member 14 is an identical, parallel set of facing apparatus, including a leaf spring 25*a* and an actuator 30*a*. Mounted on the inner surface of spring 25 is a carriage mount 35, and mounted on the inner surface of spring 25*a* is a second carriage mount 35*a*. A magnetic head carriage 36 is mounted to carriage mounts 35 and 35*a*, and adapted to carry a magnetic read-write head symbolically indicated at 37. By being so mounted, carriage 36 will have the same two direction, single dimension movement as frame 11, due to the restriction of leaf springs 25 and 25*a*. Similar to the statement made above regarding the motion of frame 11, the movement of carriage 36 will be truly arcuate, but will herein be referred to for practical purposes as being in a straight line single dimension.

Figure 2:
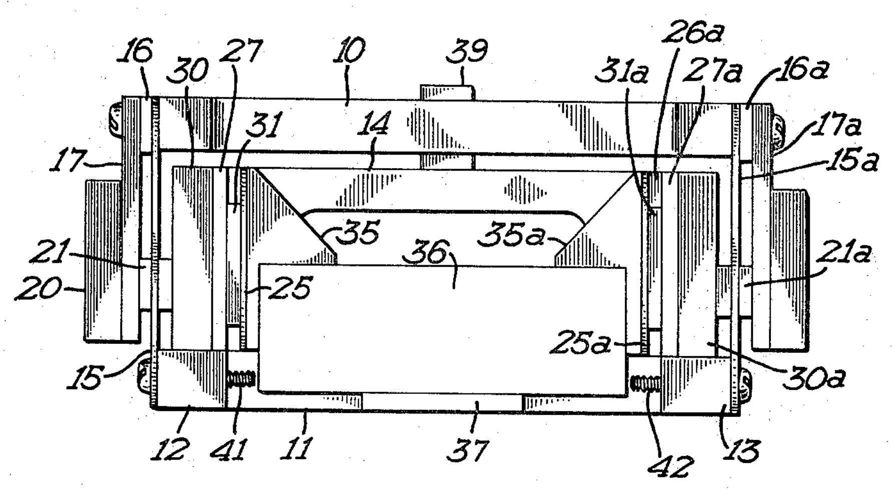
FIG. 2 is a front plane view of the assembled apparatus of this invention.

Referring now to FIGS. 1 and 2, it is seen that a pair of adjustable stop bolts 41 and 42 are mounted, respectively, in arms 12 and 13 on either side of carriage 36. Bolts 41 and 42 will provide a positive limit in each direction of movement of carriage 36 within its single dimension.

Figure 3:
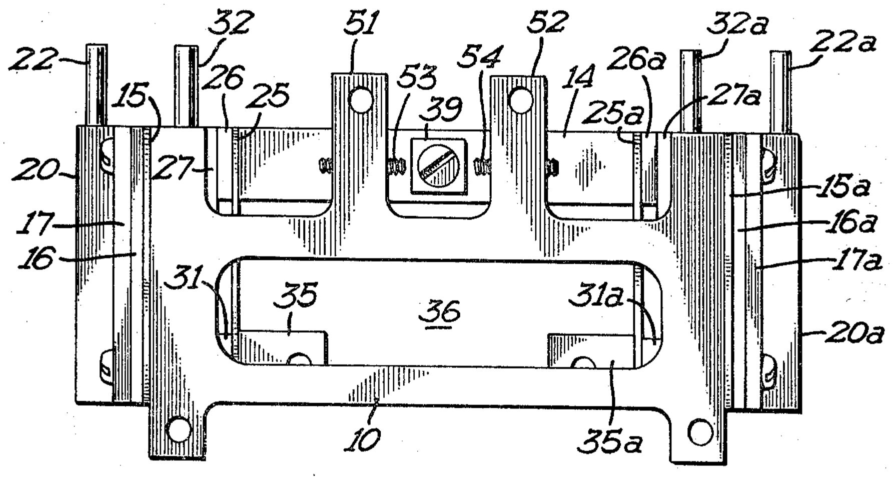
FIG. 3 is a top plane view of the assembled apparatus of this invention.

Referring now to FIGS. 1 and 3, it can be seen that a pair of parallel extending arms 51 and 52 on frame 10 define a U-shaped aperture. An extending member 39, mounted to member 14 on frame 11, extends through the U-shaped aperture formed by arms 51 and 52. A pair of adjustable stop bolts 53 and 54 are mounted, respectively, in arms 51 and 52 on either side of member 39. Thus, stop bolts 53 and 54 provide a positive limit in either direction of movement of frame 11 within its single dimension of movement.

To best understand the operation of the apparatus of this invention, it should be recognized that the application of pneumatic pressure to selected ones of actuator 20 and 20*a* and/or actuators 30 and 30*a*, will cause the respective actuator head to be forced outwardly and in turn apply force to that member which it contacts. For example, application of pneumatic pressure through tube 22 to actuator 20 will cause head 21, which extends through the aperture in spring 15 to apply force or push against the outside surface of actuator 30, which is rigidly mounted to frame 11, thus causing frame 11 to move in the same direction against the yielding pressure of springs 15 and 15*a* between which it is suspended. When the pneumatic pressure to actuator 20 is removed, the spring action of springs 15 and 15*a* will be sufficient to push head 21 and frame 11 back to their original position. Similarly, application of pneumatic pressure to actuator 20*a* will cause its head 21*a* to push on the outside surface of actuator 30*a* to cause frame 11 to move against the yielding pressure of springs 15 and 15*a*. When the pneumatic pressure is released, the spring action of springs 15 and 15*a* will return head 21*a* and frame 11 back to its original position.

The application of pneumatic pressure through tube 32 to actuator 30 will cause head 31 to extend outwardly to push on the outer surface of spring 25, thus causing carriage 36 to move in the same direction against the yielding pressure of springs 25 and 25*a*. The release of this pneumatic pressure will cause springs 25 and 25*a* to return carriage 36 and head 31 to their original positions. Similarly, application of pneumatic pressure to actuator 30*a* will cause an extension of head 31*a*, to push against the outer surface of spring 25*a*, thus moving carriage 36 against the yielding pressure of springs 25 and 25*a* to return head 31 and carriage 36 to their original position.

In actual operation, it is preferred to set stop bolts 41 and 42, and 53 and 54, and simultaneously actuate one of actuators 20 or 20*a* with one of actuators 30 or 30*a*, such that one of four positive positions of head 37 can be achieved. A first position would be achieved by applying pneumatic pressure to actuator 20 to move frame 11 such that member 39 contacts stop bolt 54, and simultaneously applying pneumatic pressure to actuator 30 so that carriage 36 contacts stop bolt 42. A second position can be achieved by maintaining the pneumatic pressure on actuator 20 so that member 39 remains in contact with stop bolt 54, releasing the pneumatic pressure to actuator 30, and applying pneumatic pressure to actuator 30*a* so that carriage 36 moves into contact with stop bolt 41. A third position can be achieved by maintaining pressure on actuator 30*a* so that carriage 36 remains at stop bolt 41, releasing the pneumatic pressure on actuator 20 and applying pneumatic pressure to actuator 20*a* such that member 39 moves into contact with stop bolt 53. Finally, a fourth position can be achieved by maintaining the pneumatic pressure on actuator 20*a* so that member 39 remains in contact with stop bolt 53, releasing the pneumatic pressure on actuator 30*a*, and applying pneumatic pressure to actuator 30 so that carriage 36 moves into contact with stop bolt 42.

It will be recognized that the order of the above positions need not be the succession described above. Rather, actuation of any two of the actuators described above may be selected at any time to provide the positioning desired. It will be further recognized that swift application and release of the pneumatic pressure allows for high speed position selecting. Also, the apparatus of this invention is essentially maintenance free in that the spring action of the parallel pairs of leaf springs and the diaphragm action of the pneumatic actuators are essentially friction free and require no lubrication. Note, for example, that heads 21 and 21*a* extend through an aperture in the respective of springs 15 and 15*a* to provide their force against frame 11, rather than pushing directly on springs 15 and 15*a*, thus adding longer life to the springs. Further, heads 31 and 31*a* push against those portions of the springs 25 and 25*a*, respectively, which are reinforced by their respective connections to carriage mounts 35 and 35*a*.

It is also important to note that the length to width ratios are almost equal for each of the leaf springs 15, 15*a*, 16 and 16*a*. This provides necessary rigidity in all planes other than the plane of the dimension of desired movement. This rigidity is obviously necessary and desirable to prevent positioning error between the magnetic head and the selected track.

Finally, it will be recognized that the apparatus of this invention provides accurate positioning with a minimal amount of adjustment during production or use, in that only stop bolts 41, 42, 53 and 54 need be adjusted to provide positive positioning of the magnetic head 37 with respect to a selected track. Also, it will be apparent that the apparatus of this invention can be manufactured, assembled and installed at a comparatively low unit cost.

The embodiments of the invention in which an exclusive property or privilege is claimed are defined as follows:

1. In a magnetic recording system in which magnetic head means are used to read from or write on any selected one of a plurality of magnetic tracks, the improved head positioning apparatus comprising:
   - first frame means adapted for rigid mounting;
   - second frame means;
   - carriage means adapted to carry a magnetic head;
   - first spring means connecting said second frame means to said first frame means;
   - second spring means connecting said carriage means to said second frame means; and
   - actuator means mounted in operative relation to said head positioning apparatus for selectively applying flex force to said first and second spring means for moving said carriage means reciprocally along a path generally parallel to said magnetic tracks.

2. The apparatus of claim 1 in which:
   - said first spring means comprise a pair of parallel spaced leaf springs each having one end connected to said first frame means and another end connected to said second frame means; and said second spring means comprise a pair of parallel spaced leaf springs each having one end connected to said second frame means and another end connected to said carriage means.

3. The apparatus of claim 1 including:

stop means for selectively limiting travel due to flex force applied by said actuation means.

4. The apparatus of claim 1 in which:

said actuator means comprise pneumatic means for applying flex force under pneumatic pressure and releasing the force when the pressure is removed.

5. Head positioning apparatus for a magnetic read-write head magnetic recording system comprising:

a first frame adapted for rigid mounting;

a first pair of leaf springs connected to said first frame in parallel spaced relation and extending normally and downwardly therefrom, each of said first pair of springs having an aperture therein;

a second frame connected between said first pair of springs in spaced relation to said first frame;

a second pair of leaf springs connected to said second frame in parallel spaced relation and extending normally and outwardly therefrom, so that each of said second pair of springs is adjacent one of said first pair of springs;

a first pair of actuator mounting plates mounted on said second frame and one positioned between each adjacent pair of springs;

first actuator means mounted on said first actuator mounting plates for contacting each of said second pair of springs when actuated;

a second pair of actuator mounting plates mounted on said first frame and one positioned adjacent each of said first pair of springs;

second actuator means mounted on said second actuator mounting plates, and extending through the apertures therein for contacting said first actuator means when actuated; and magnetic head carriage means connected between said second pair of springs in spaced relation to said first frame means.

6. The apparatus of claim 5 in which said first and second actuator means comprise pneumatic actuators for applying force to means contacted when pneumatic pressure is applied thereto and releasing the force when the pneumatic pressure is released.

7. The apparatus of claim 6 including:

first adjustable stop means mounted on said first frame for selectively limiting movement of said second frame; and second adjustable stop means mounted on said second frame for selectively limiting movement of said carriage means.

8. The apparatus of claim 7 in which:

said first frame includes an aperture;

said first stop means comprise a pair of screws threaded in said first frame and extending oppositely into said aperture; and said second frame includes an arm extending into said aperture between said screws.

9. The apparatus of claim 7 in which:

said second frame includes a U-shaped aperture;

said second stop means comprise a second pair of screws threaded in said second frame and extending oppositely into said U-shaped aperture; and said head carriage means extends into said U-shaped aperture between said second pair of screws.

References Cited

UNITED STATES PATENTS

| | | | |
|---|---|---|---|
| 2,862,781 | 12/1958 | Baumeister | 340—174.1 |
| 3,193,811 | 7/1965 | Clarke et al. | 340—174.1 |
| 3,308,450 | 3/1967 | Bouroon et al. | 340—174.1 |
| 3,310,792 | 3/1967 | Groom et al. | 340—174.1 |
| 3,403,388 | 9/1968 | Linsley | 340—174.1 |
| 3,405,404 | 10/1968 | Johnson | 340—174.1 |

BERNARD KONICK, Primary Examiner

V. P. CANNEY, Assistant Examiner

U.S. Cl. X.R.

179—100.2